1,993,443

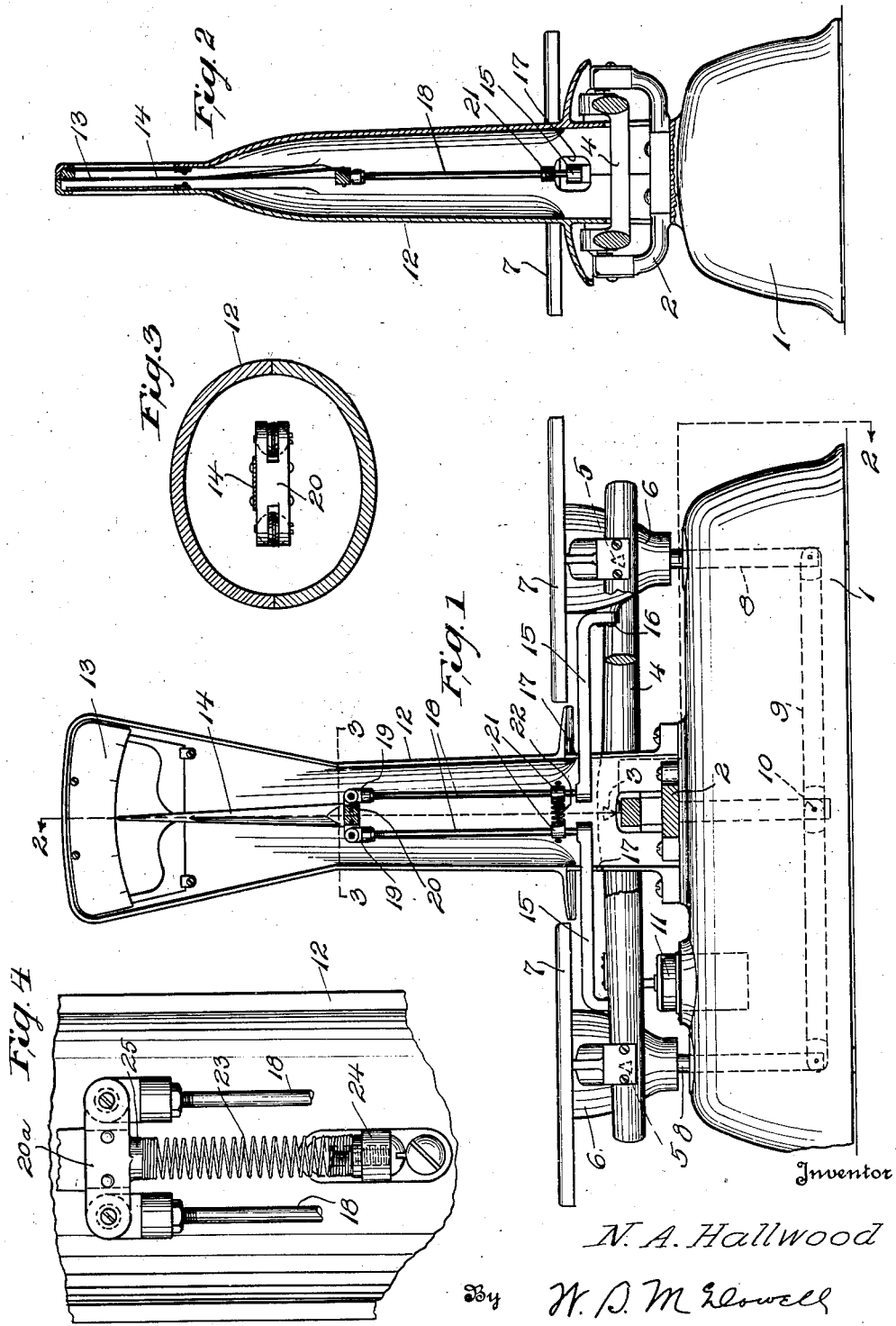
March 5, 1935. N. A. HALLWOOD 1,993,443
SCALE
Filed Feb. 7, 1930
Inventor
N. A. Hallwood
By W. D. McDowell
Attorney Patented Mar. 5, 1935

UNITED STATES PATENT OFFICE 1,993,443

SCALE

Nathan A. Hallwood, Columbus, Ohio

Application February 7, 1930, Serial No. 426,687

6 Claims. (Cl. 265—58)

This invention relates to improvements in weighing scales, and is particularly directed to scales of the so-called "even balance type", wherein the characteristic feature of which is a beam or lever pivoted at the center of its length and carrying at opposite ends suitable pans or receivers for the commodity to be weighed and counter-weights respectively. In the use of a scale of this character it is customary to place the commodity to be weighed upon one receiver and add known weights to the other receiver until the beam is approximately balanced. It has been customary in scales of this type to provide the beam or lever with motion transmitting means for imparting oscillatory motion to a movable pointer arranged for travel over an arcuate scale provided in the upper portion of a housing which arises stationarily and centrally from the base of the scale and wherein mechanism is provided for returning the pointer and the beam to a normal position when the scale is unweighted. The motion transmitting means between the beam and the pointer usually provide for multiplied motion of the pointer with respect to the motion of the beam in order that by observing the relative positions of the pointer with respect to the arcuate scale the degree of deflection of the beam from its normal position may be conveniently and accurately determined.

It is a primary object of the present invention to provide an improvement in such scales by providing an improved form of motion transmitting means for effecting the oscillation of the pointer or indicator which is movable over an arcuate scale for the purposes of denoting the balanced and unbalanced positions of the weighing means, and wherein instead of operating said motion transmitting means directly from the beam the said means are directly operated from the pivoted weight receivers carried by the opposite ends of the beam to the end of securing free and positive operation on the part of the indicator with negligible friction, mechanical complication and other conditions which tend to set up error and short operating life in previous mechanisms of this character.

In accordance with the present invention, the central pivoted beam of the scale carries at its outer ends the usual weight receivers and their out-riders, which travel vertically. These out-riders are provided with fixed inwardly extending brackets which move in unison with the out-riders in response to oscillatory movements on the part of the beam. The inner ends of the bracket terminate in a centrally arranged indicator tower or housing which arises stationarily from the base of the scale, and these inner ends of the brackets are provided with a pair of spaced upwardly extending rods which are located within the tower. The upper ends of these rods are pivotally connected with the ends of a transversely extending cross link to which is rigidly fixed the lower portion of an oscillating indicator or pointer, the upper end of the latter traveling over an arcuate scale arranged in the upper portion of the tower. By this arrangement when the beam oscillates from a normally balanced position one of the out-riders will descend while the other moves upwardly in proportional increments of travel. This results in corresponding downward motion on the part of one of said rods and upward motion on the part of the other with the result that the link connecting the upper ends of the rods is moved to assume angular positions with respect to the horizontal, thereby oscillating the indicator or pointer over the arcuate scale to provide visual indication of the degree of deflection of the beam from its balanced position.

It is another object of the invention to associate spring means with the indicator supporting and operating mechanism arranged in the tower, whereby said spring means will be distorted when the beam moves from its balanced position in response to uneven distribution of weights on the weight supports and whereby when the beam is unweighted said spring means will function to effect the restoration of the beam and the pointer to normal positions.

With these and other objects in view which will appear as the description proceeds, the invention consists in the novel features of construction, combinations of elements and arrangements of parts hereinafter to be fully described and pointed out in the appended claims.

In the accompanying drawing:

Figure 1 is a view partly in side elevation and vertical section of an even balance weighing scale constructed in accordance with the present invention, Figure 2 is a vertical transverse sectional view taken through the indicator tower of the scale on the line 2—2 of Figure 1, Figure 3 is a transverse horizontal sectional view on the line 3—3 of Figure 1, and Figure 4 is a detail view of a modified form of the invention.

Referring more particularly to the drawing, the base of the scale is indicated by the numeral 1, in this instance the base comprising the usual hollow cast body arranged to be mounted on a counter or other form of support. The upper portion of the base is provided centrally with a stirrup 2 which carries the usual fulcrum box for the reception of the knife edge bearings 3 of the scale beam or lever 4. The outer ends of the beam or lever carry the usual knife edges 5 which effect the pivotal support of the out-riders 6, the upper portions of the latter being provided with the customary plates or pans 7 constituting weight receivers. A known weight is applied to one of these receivers and the commodity to be weighed to the other so that when the beam is in a balanced position the weight of the commodity will be apparent by reference to the known weight. The out-riders are provided with the usual depending stems 8 which move vertically in openings provided therefor in the base 1 in response to the oscillation of the beam 4. The lower ends of the stems 8 are connected with a horizontally extending check rod 9 arranged in the base 1 and pivoted at the center as at 10 in vertical alignment with the bearings 3. A dash pot 11 is formed in the base 1 and is connected, as usual, with the beam 4 to dampen the oscillations of the latter in response to weight applications. Stationarily mounted on the base 1 and arising from the upper central portion thereof is an indicator tower 12, the upper end of the latter being provided with an arcuate scale 13 formed with suitable graduations. Co-operative with the scale is an indicator or pointer 14 which is adapted to travel over the scale in response to the oscillations of the beam, whereby the degree of deflection of the beam from its normal balanced position may be readily noted. The scale so far described is of common construction, well understood by those skilled in the art, and therefore a further detailed description relative thereto is not deemed necessary.

The present invention has particular reference to the mechanism for effecting the mounting of the pointer 14 and the movement of such pointer over the scale 13 in response to the movements of the beam from its normal position. Heretofore it has been customary to operate the pointer by means of motion transmitting mechanism carried directly by the beam and I have found that such mechanisms are unreliable in practice and are quite apt to introduce error into the operating mechanism of the indicator or pointer due principally to the oscillating motion of the beam when it is deflected from normal. Instead of utilizing directly the motion of the beam the present invention resides in operating the under and over weight indicator 14 from the weight receivers or out-riders 6 which, because of their pivotal mountings on the ends of the beam, reciprocate back and forth vertically when the beam is oscillated, and I have found that this reciprocatory motion may be advantageously used in effecting the operation of the pointer in lieu of the customary oscillatory movement.

To this end the out-riders are provided with inwardly extending brackets 15 which are rigidly connected with the out-riders at their outer ends, as indicated at 16. These brackets lie substantially horizontally above the beam 4 and the inner ends of the brackets project through vertical slots 17 provided in the side walls of the tower 12. The spaced inner ends of the brackets are formed to include sockets for the rigid connection of the lower ends of a pair of spaced vertically positioned rods 18 which are adapted to move with the out-riders 6. The upper ends of these rods 18 are threaded for the adjustable reception of ears 19 which are positioned, as shown in Figure 3, in slots provided in the bifurcated outer ends of a cross link 20. This cross link carries and is rigidly secured to the lower end of the pointer 14 and provides a base for the pointer. Contiguous to their lower ends the rods 18 carry collars 21 which are adjustably positioned upon the rods and held in frictional engagement therewith by any suitable fastening means such as screws or the like. Between the collars 21 is confined a coil spring 22, which has its ends secured in any desired manner to the collars. The spring 22, which is subjected to a flexible action by the movement of the rods 18 in opposite directions will tend to straighten and return the beam to a horizontal balanced position.

In view of the foregoing it will be seen that when the beam oscillates one of the out-riders will move downwardly vertically while the other out-rider will move to a corresponding degree in an upward direction. This motion is, of course, transmitted to the rods 18, one of which moves downwardly and the other upwardly in increments of travel directly proportional to the movements of the out-riders with which they are connected. As a result of this relative movement on the part of the rods, the link 20 which is carried directly by the rods 18 is moved to an angular position with respect to the true horizontal position which it normally occupies when the beam is balanced equally at both of its ends. This results in the oscillation of the pointer over the arcuate scale from its normal zero position and in a direction dependent upon which of the weight receivers contains the greater weight. In this manner under and over weights may be readily denoted by comparing the position of the pointer with respect to the zero position provided centrally on the scale 13. When the weights have been removed from the plates 7 the beam together with the pointer 14 are returned to normal positions and are maintained in such normal positions by the operation of the spring 22.

In Figure 4 a slight structural variation of the invention is disclosed wherein a spring 23 is used in lieu of the spring 22 for performing the same functions. The spring 23 is connected at its lower end with a support 24 carried by the tower 12, while the upper end of the spring is connected with a boss 25 depending from the lower central portion of the cross link 20a. Either the spring constructions 22 or 23 may be employed advantageously. The pointer operating mechanism disclosed has the advantage of simplicity in construction together with accuracy and reliability in operation. Friction has been reduced to a minimum to relieve the operation of the scale from error due to this cause.

It will be understood that the present invention is not to be limited to the specific structural arrangement set forth but that such arrangements may be varied from time to time without departing from the essential principles and spirit of the invention as the latter has been expressed in the following claims.

What is claimed is:

1. In a weighing scale, a base, a centrally pivoted beam mounted on said base, weight receivers pivotally mounted on said beam contiguous to the ends thereof, an indicator tower arising centrally and stationarily from said base between said weight receivers and provided at its upper end with a chart, an indicator arranged in said tower and movable over said chart, brackets secured to said weight receivers extending into the lower portion of said tower, spaced upwardly extending rods rigidly connected with the inner ends of said brackets, a cross member pivotally connected at its ends with the upper ends of said rods and to which cross member the lower portion of said indicator is directly connected, whereby said indicator is supported from said weight receivers and operated directly by the motion thereof, and spring means co-operative with said cross member arranged in said tower for returning said beam and indicator to normal position.

2. In a scale, a base, a centrally pivoted even balance beam mounted on said base, weight receivers pivotally mounted on said beam contiguous to the ends thereof, an indicator tower arising centrally and stationarily from said base between said weight receivers and provided at its upper end with a chart, an indicator arranged in said tower and movable over said chart, vertically arranged members secured to said weight receivers, a cross link pivotally connected at its ends with said members and to which cross link the base portion of said indicator is directly connected, whereby said indicator is supported from said weight receivers and operated directly by the motion thereof, and a helical spring connected centrally of said cross link and to said indicating tower and serving to return said beam and indicator to a normal position.

3. In a weighing scale, a base, a centrally pivoted beam mounted on said base, weight receivers pivotally mounted on said beam contiguous to the ends thereof, an indicator tower arising centrally and stationarily from said base between said weight receivers and provided at its upper end with a chart, an indicator arranged in said tower and movable over said chart, brackets secured to said weight receiver and extending into the lower portion of said tower, spaced upwardly extending rods rigidly connected with the inner ends of said brackets, a cross member pivotally connected at its ends with the upper ends of said rods and to which cross member the lower portion of said indicator is directly connected, whereby said indicator is supported from said weight receiver and operated directly by the motion thereof, and spring means for returning said beam and indicator to a normal position.

4. In a scale, a base, a centrally pivoted even balanced beam mounted on said base, weight receivers pivotally mounted on said beam contiguous to the ends thereof, an indicator tower arising centrally and stationarily from said base between said weight receivers and provided at its upper end with a chart, an indicator arranged in said tower and movable over said chart, vertically arranged members rigidly secured to said weight receivers, a cross link pivotally connected at its ends with the upper ends of said members and to which cross link the lower portion of said indicator is directly connected, whereby said indicator is supported from said weight receiver and operated directly by the motion thereof.

5. In a scale, a base, a centrally pivoted even balanced beam mounted on said base, weight receivers pivotally mounted on said beam contiguous to the ends thereof, an indicator tower arising centrally and stationarily from said base between said weight receivers and provided at its upper end with a chart, vertically arranged members rigidly secured to said weight receivers and arranged for movement within said tower, and an indicator arranged in said tower and movable over said chart, said indicator includes a fulcrumless base pivotally connected to the upper ends of said members whereby said indicator is supported from said weight receivers and operated directly by the motion thereof.

6. In a scale, a base, a centrally pivoted even balanced beam mounted on said base, weight receivers pivotally mounted on said beam contiguous to the ends thereof, an indicator tower secured to said base and provided at its upper end with a chart, vertically arranged members rigidly secured to said weight receivers, a cross link pivotally connected at its ends with the upper ends of said members, and an indicator provided upon said link and movable over said chart in response to the action of said weight receivers.

NATHAN A. HALLWOOD.